Aug. 11, 1959 L. BONNERRE 2,899,527
MOULD FOR VULCANIZATION OF ELECTRICAL CABLES
Filed Aug. 1, 1957 4 Sheets-Sheet 1

INVENTOR
LUCIEN BONNERRE
ATTY.

Aug. 11, 1959     L. BONNERRE     2,899,527
MOULD FOR VULCANIZATION OF ELECTRICAL CABLES
Filed Aug. 1, 1957     4 Sheets-Sheet 2

INVENTOR
LUCIEN BONNERRE
BY Irwin S. Thompson
ATTY.

Aug. 11, 1959   L. BONNERRE   2,899,527
MOULD FOR VULCANIZATION OF ELECTRICAL CABLES
Filed Aug. 1, 1957   4 Sheets-Sheet 3
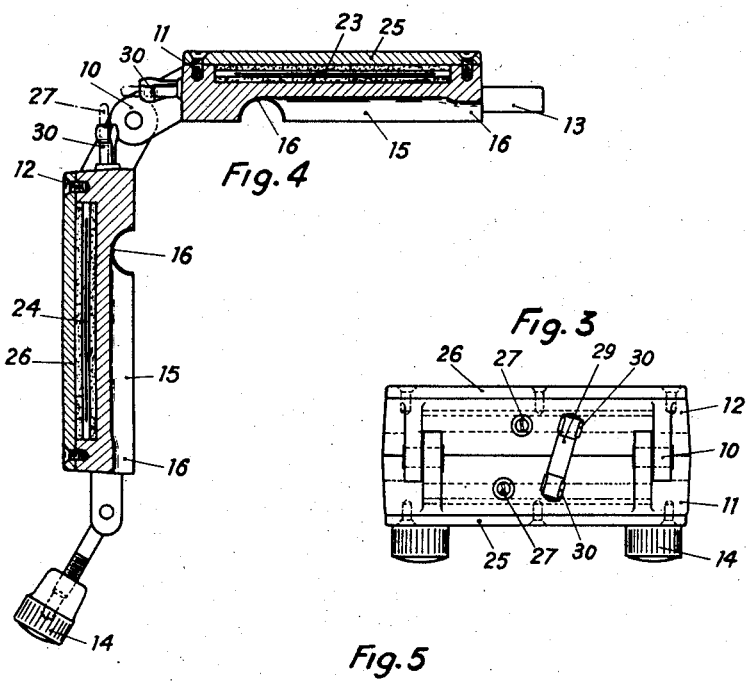
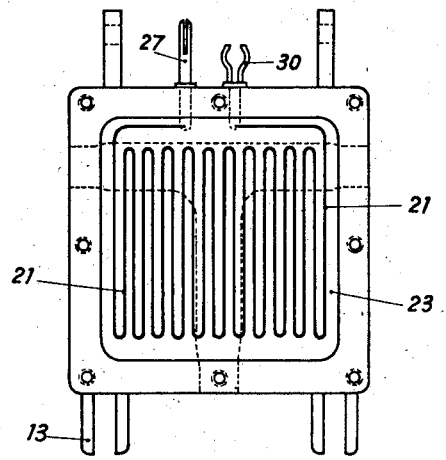
INVENTOR
LUCIEN BONNERRE
BY Irwin S. Thompson
ATTY.

Aug. 11, 1959     L. BONNERRE     2,899,527
MOULD FOR VULCANIZATION OF ELECTRICAL CABLES
Filed Aug. 1, 1957     4 Sheets-Sheet 4
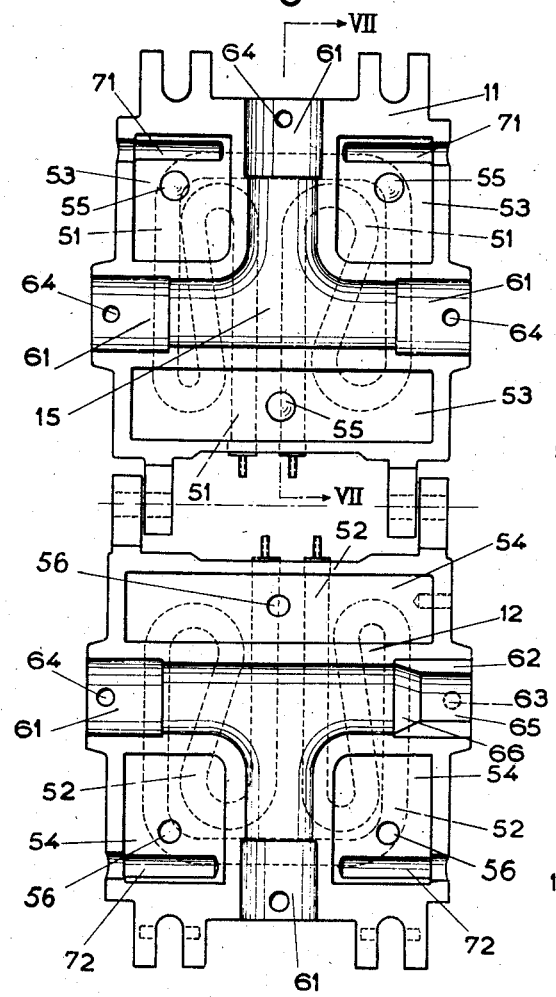
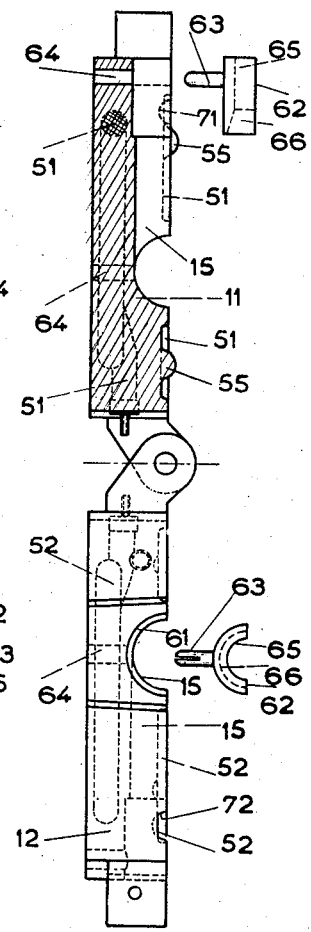
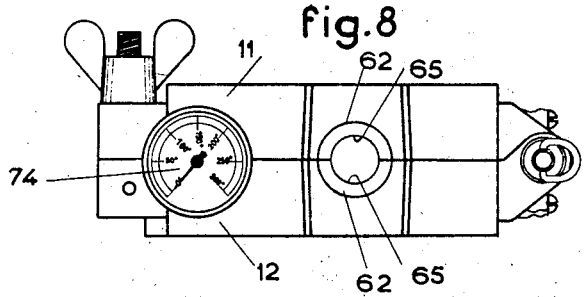
INVENTOR
LUCIEN BONNERRE

United States Patent Office 2,899,527
Patented Aug. 11, 1959

2,899,527
MOULD FOR VULCANIZATION OF ELECTRICAL CABLES

Lucien Bonnerre, Phalempin, France, assignor to Compagnie Auxiliaire d'Electricite et d'Entreprise, Lille, Nord, France Application August 1, 1957, Serial No. 675,628

Claims priority, application France August 27, 1956

6 Claims. (Cl. 219—19)

In a known method of making joints, derivation connections or terminal connections in electrical cables, after having carried out the necessary operations on the conductors, the exterior insulating sheath, which may for example be of synthetic rubber, is replaced on part of the length of the cable by a means for applying insulating material, which material is afterwards hot vulcanized.

The present invention relates to a portable mould enabling this method to be carried out more easily and quickly.

The mould according to the invention is characterized in that it comprises two superimposable shells provided with recesses in which the part of the cable to be vulcanized can be placed, the two shells comprising locking means in order to hold them together, and an electrical element such as a resistance for heating the mould up to the vulcanization temperature.

In a preferred embodiment of the invention, each shell of the mould has a certain heat storage inertia and contains an electrical resistance located in its wall, so as to make it possible to heat the mould either by means of the said electrical resistance or by an external source of heat, such as the flame of a blow-pipe.

The shells may be formed by moulding a metal around a heating resistance of the embedded type.

According to a particular form of execution a fuse is connected in series with the heating resistance, this fuse allowing the passage of current only during the time which is necessary for the vulcanization. Thus the operation of the mould necessitates less watching.

At the ends of the recesses intended to receive the cable to be vulcanized, there are seatings for half-rings detachably mounted and provided to adjust the circumference of said mould at this point. By the right choice of the half-rings from a suitable set this arrangement makes it possible to use the same mould for vulcanizing cables of different diameters.

Figures 1, 2 and 3 show the closed mould in elevation, from the sides and from above.

Figure 4 is a section along line IV—IV of Figure 1 of the open mould.

Figure 5 is a plan view of the mould after the removal of one of the lids.

Figure 6 is a plan view of a further embodiment of the mould in the open position.

Figure 7 is a side view with a partial section along line VII—VII of Figure 6.

Figure 8 is a side view of the mould in closed position with a thermometer placed in position.

Figure 1:
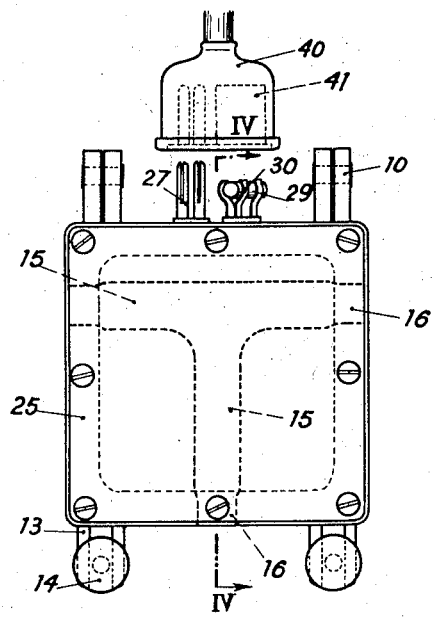
Figure 2:
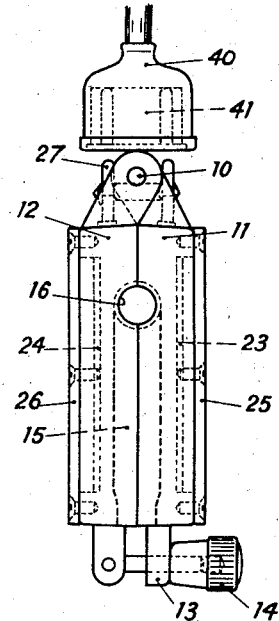

The mould shown in Figures 1 to 5 is designed for the vulcanization of derivation connections. It comprises self-contained means of heating consisting of incorporated electrical resistances.

More precisely the mould consists of two shells 11 and 12 hinged at 10. The shell 11 carries lugs 13 which can be engaged by securing nuts 14 mounted on the shell 12.

Each shell has a semi-cylindrical recess 15 of T-shape, slightly restricted near the ends 16.

The heating resistances 21 are placed in the seatings 23, 24 provided for this purpose in the shells 11 and 12 and are insulated in some suitable way by asbestos or fire-proof earthenware. Said seatings are protected by detachable lids 25, 26 attached to the shells 11 and 12.

Each shell is provided adjacent the hinges 10 with a connecting pin 27 and resilient jaws 30 forming contacts and allowing the removable insertion of a fuse 29. The latter is connected in series with the pins 27 and the resistances 21.

The fuse 29 is preferably calculated for allowing a current to pass for the period of time necessary for the vulcanization.

The feed plug 40 of the female type has in its turn a cavity 41 accommodating the fuse 29 when the plug is connected.

This mould is operated in the following manner:

Under the influence of heat, the rubber material, with which the sheath of the cables has been replaced, melts, but it cannot escape from the mould owing to the constriction provided at the ends 16. In this way vulcanization under pressure of the cable sheath is carried out at the place of the junction.

When the time limit for the vulcanization has been reached, the fuse 29 melts and automatically breaks the current supply without the necessity of using a thermometer. It suffices to replace the fuse for each operation. Moreover it should be observed that the arrangement of the pins 27, the jaws 30 and the structure of the plug 40 constitute a safety device. In fact, the resistance heater can only be placed under a potential after the shells have been closed and the fuse fixed.

In the same way the current must be broken as the plug 40 has to be removed before it is possible to draw out the fuse and open the mould.

In the embodiment of Figures 6 to 8 the shells 11 and 12 are solid and made of a light metal, such as for instance aluminium or one of its alloys, cast or calcined so that the electrical heating elements are embedded in it. These consist of electrical resistances inside a tube of ceramic material able to radiate heat but not to conduct electricity, the whole being enclosed in a metal sheath 51 or 52 and forming a resistance of the embedded type.

Figure 9:
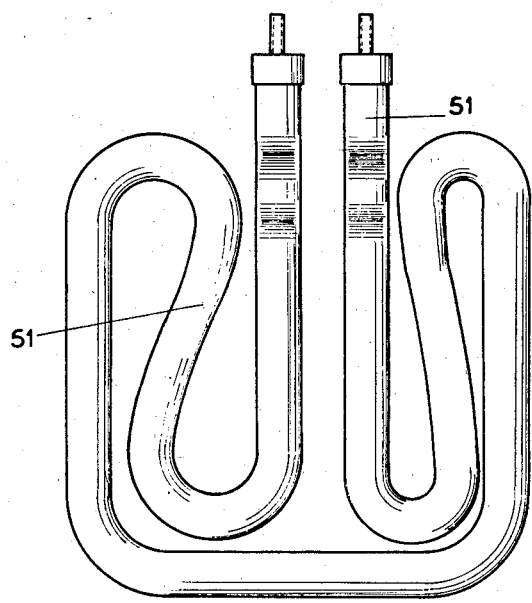
Figures 9 and 10 are a plan view and a side view, respectively, of a heating element before being embedded in the mould material.
Figure 10:
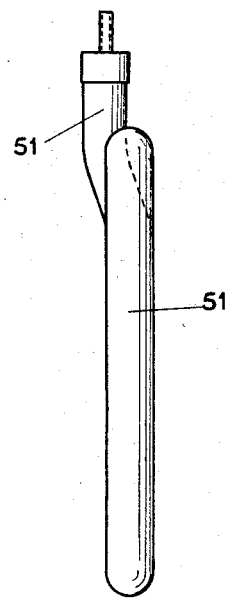

Said sheaths are profiled as shown in Figures 9 and 10 and their arrangement in relation to the recesses 15, 16 is such that a thermal flow across said recesses is uniform, when the heating resistances are in action.

Since the shells of such construction are solid it is possible to heat them directly by means of the flame of a blow-pipe which makes it possible to use the same mould in any place.

In a preferred embodiment as shown in Figures 6 to 8 the shells 11 and 12 have cavities 53, 54 to take up excessive material at the moment of heating. In these cavities are arranged projections 55 and hollows 56, respectively, ensuring a perfect registration of the shells when they are pressed together for action (Figure 8).

Besides means are provided to adapt the mould for jointing conductors of any optional diameter so as to have a mould of universal type.

Figure 11:
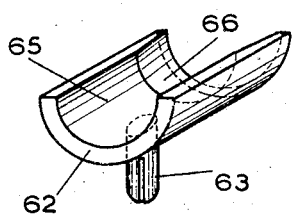
Figure 11 is a perspective view on a larger scale of a removable half-ring to be placed in the recess of the mould.

For this purpose the ends of the recesses 15 are hollowed and form semi-cylindrical grooves 61 to take up half-rings 62 (Figures 6, 7 and 11) which are each provided with a plug pin 63.

In order to ensure a detachable fixing for the half-rings 62 in the groove 61, its plug pin 63 is introduced into a round hole in said groove. As the pins 63 carry two comparatively flexible segments a resilient contact is produced between the parts 63, 64.

The inner surface of the half-ring 62 has a cylindrical portion 65 of a smaller diameter than the recess 15 and a portion 66 in the shape of a truncated cone joining the two said surfaces together.

When carrying out the operation according to the invention for the same mould there are provided various sets of six half-rings 62. For each set the interior diameter of the cylinder 65 corresponds to the diameter of the conductors of a certain type.

In this way it is possible to use the same mould for jointing conductors of any cross section.

Figure 12:
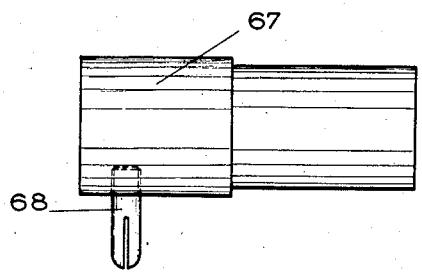
Figure 12 is a side view of a detachable bushing used for the same purpose as said rings.

If it is desirable not to make a derivation but a joint, in a straight line or at an angle between two conductors, according to the invention a bushing 67 (Fig. 12) is placed in one of the T-branches, which bushing is provided with a pin 68 similar to pins 63 of the half-rings 62.

This cylindrical bushing closes the branch of the recess in question and in this way the penetration of pasty insulating material in this branch is prevented during the vulcanization.

Figure 13:
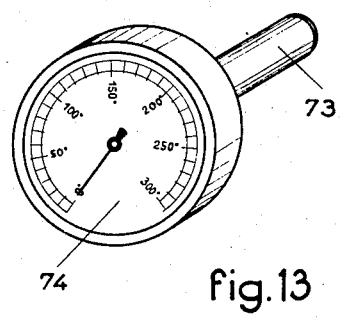
Figure 13 is a perspective view of a thermometer to be used in the moulds of Figures 6 to 8.

In order to check the vulcanization temperature there are provided in each shell 11 and 12, in corresponding places, semi-cylindrical bores 71, 72 to take up the sensitive tube 73 of a metal thermometer (Figure 13). When the two shells 11 and 12 are pressed together they surround the tube 73, while the dial 74 extends beyond the mould (Figure 8).

During vulcanization it is thus possible to check the rise in temperature.

The mould according to the invention thus represents a simple, strong and inexpensive means for carrying out various operations on electrical conductor sheaths.

It is obvious that the invention is not limited by the embodiments described and that the construction can be modified in several ways.

Thus in the case of a mould conforming with Figs. 1 to 5 the recesses in the shells can have another shape: X or star shape according to the jointing operation to be carried out.

The part provided with recesses might be mounted in a detachable manner on each shell, which allows various connection with the same shells.

In the case of a mould conforming with Figs. 6 to 8, the shells 11 and 12 might be formed by a moulded electrically insulating material, surrounding the heating resistances.

In addition, the resistances may have any suitable shape.

I claim:

1. A portable mould for the vulcanization of electric cables of various diameters, said mould comprising two hinged shells having superimposable inner surfaces, locking means for joining together said shells when superimposed, substantially half cylindrical longitudinal recesses in corresponding positions in said surfaces, said recesses accommodating the cables to be vulcanized, with the dimensions of said grooves being greater than the largest diameter of the cables to be vulcanized, a set of half rings of various diameters respectively corresponding to the various diameters of the cables to be vulcanized with the outer surface of said half-rings engaging said grooves, and means for detachably mounting said half-rings within said grooves.

2. A portable mould for the vulcanization of electric cables of various diameters according to claim 1, wherein said half-rings have a semicylindrical interior surface, of a smaller diameter than that of the recess of the shell, said half-ring interior surface having a bell mouthed surface at the inner end thereof, said latter surface ensuring the connection between said cylindrical surfaces of said half-ring and of said recess, when said half-ring is mounted on said shell.

3. A portable mould according to claim 1 wherein said means for detachably mounting said half-rings consist of a plug pin mounted on the outer surface of the half-ring and arranged to penetrate in a corresponding cavity in each of said terminal grooves.

4. A portable mould for the vulcanization of rectilinear and angular electrical cable junctions and derivations comprising two hinged shells having superimposable inner surfaces, locking means for joining together said shells when superimposed, substantially half cylindrical recesses in said surfaces, said recesses accommodating the cable to be vulcanized, and having a T-shape with three branches, at least one cylindrical detachable bushing provided for insertion in one of said branches of said recess according to the kind of junction to be made, each of said shells consisting of a shaped material having a thermal inertia and comprising an electrical heating resistance embedded within and in thermally but not electrically conductive relation with said metal, means for connecting said heating resistances to an electrical feeding source, said mould permitting the vulcanization temperature to be reached for said cables by heating from said resistances or an external heating source.

5. A portable mould for the vulcanization of electrical cables, comprising two hinged shells having superimposable inner surfaces, locking means for joining together said shells when superimposed, substantially half cylindrical recesses in corresponding positions in said surfaces, said recesses accommodating the cable to be vulcanized, each of said shells consisting of a shaped metal having a thermal inertia and comprising an electrical heating resistance embedded within and in thermally but not electrically conductive relation with said metal, means for connecting said heating resistances to an electrical feeding source, said connecting means comprising on the external surface of each of said shells a pin and a jaw in corresponding positions respectively connected to the ends of said electrical heating resistance, a fuse engaged within said jaws when said shells are joined together, said fuse allowing the flow of current only during the time necessary for vulcanizing said cable, and a feed plug of the female type to be engaged with said pins, said plug having a cavity for accommodating said fuse in the feeding position.

6. A portable mould for the vulcanization of electrical cables, comprising two hinged shells having superimposable inner surfaces, locking means for joining together said shells when superimposed, substantially half cylindrical recesses in corresponding positions in said surfaces, said recesses accommodating the cable to be vulcanized, each of said shells consisting of a shaped metal having a thermal inertia and comprising an electrical heating resistance embedded within and in thermally but not electrically conductive relation with said metal, said inner surfaces of said shells further having in corresponding positions semicylindrical grooves projecting toward the center of said surfaces, said mould comprising also a detachable dilatation thermometer having a sensitive tube and a dial, said grooves being arranged to receive said sensitive tube when said shells are joined together, and means for connecting said heating resistances to an electrical feeding source, said mould permitting the vulcanization temperature to be obtained for said cables by heating from said resistances or by an external heating source.

(References on following page)

References Cited in the file of this patent

UNITED STATES PATENTS

| | | |
|---|---|---|
| 1,978,156 | Gay | Oct. 23, 1934 |
| 2,099,499 | Raney | Nov. 16, 1937 |
| 2,184,630 | Alexander | Dec. 26, 1939 |
| 2,266,480 | Steiner | Dec. 16, 1941 |
| 2,407,683 | Prentice | Sept. 17, 1946 |
| 2,570,657 | Fannen | Oct. 9, 1951 |
| 2,615,082 | Mamola | Oct. 21, 1952 |
| 2,743,347 | Porter | Apr. 24, 1956 |
| 2,801,443 | Duerksen | Aug. 6, 1957 |